Patented Oct. 12, 1943

2,331,805

UNITED STATES PATENT OFFICE 2,331,805

SYNTHETIC RESIN AND PROCESS OF PRODUCING THE SAME

Paul H. Scrutchfield, Chester, Va., assignor to Hercules Powder Company, Wilmington, Del., a corporation of Delaware No Drawing. Application October 3, 1941, Serial No. 413,479

14 Claims. (Cl. 260—26)

This invention relates to synthetic resins and more particularly to improved esterification products of condensates formed from rosin acids and esters thereof with an aldehyde and an unsaturated polycarboxylic acid.

Rosin and modified rosins have heretofore been esterified with polyhydric alcohols to produce fairly hard resins of relatively low acid number, which have been used in the paint and varnish fields. However, these resin esters have a drop melting point of from about 85 to about 95° C., which is not as high melting as is desired for fast bodying and fast drying varnishes.

Rosin has been treated with formaldehyde, in the presence or absence of saturated organic or inorganic acids. However, the products obtained did not melt at a much higher temperature than the rosin itself and therefore have found only limited utility.

The reaction of maleic anhydride with rosin through the diene synthesis is well known. From the condensation of rosin with maleic anhydride a high melting point product of increased acidity is obtained. When the maleic modified rosin is esterified with polyhydric alcohol, e. g., glycerin, esters are obtained which have increased melting points as compared with the glyceryl esters of ordinary rosin. For example, the glyceryl ester of ordinary rosin possesses a melting point of about 85–95° C., whereas the glyceryl ester of maleic anhydride modified rosin, wherein 1 to 5 parts of maleic anhydride are condensed with 100 parts of rosin prior to the esterification with glycerin has a melting point of about 110–115° C. Because of their increased melting point, the polyhydric alcohol esters of maleic modified rosin are more desirable for use in paint and varnish formulation than polyhydric alcohol esters of ordinary rosin. However, the use of maleic anhydride modified rosin for the preparation of glyceryl esters is disadvantageous in a number of respects among which are the following:

When maleic anhydride is condensed with rosin, the acid number is increased over that of the original rosin. Accordingly, more polyhydric alcohol is required to esterify the adduct to a minimum acid number. Thus, theoretically, 9 parts of glycerin are required to esterify 100 parts of ordinary rosin of an acid number of 165 to an acid number of 0, whereas 11.35 parts of glycerin are required to esterify a rosin-maleic anhydride adduct prepared from rosin and 10% number of 0. Maleic anhydride is relatively expensive and the use of large amounts of maleic anhydride for the modification of rosin to obtain high melting point polyhydric alcohol esters is economically undesirable. A number of other disadvantages of the use of rosin-maleic anhydride adduct in place of rosin are met with.

Now in accordance with this invention, it has been found that improved esters having rosin or an unsaturated rosin acid as the base and having lower ingredient cost than is normally associated with similar esters may be produced by reacting an alcohol such as a polyhydric or a monohydric alcohol with a conjoint condensation product of an unsaturated rosin acid or an ester thereof, an aldehyde, and an alpha beta unsaturated polycarboxylic acid. For example, the condensate obtained by reacting conjointly rosin with formaldehyde in the presence of maleic anhydride or maleic acid may be esterified with a monohydric alcohol or with a polyhydric alcohol such as glycerin to yield the product of the present invention.

In my copending application, Serial No. 413,480, filed of even date herewith, now Patent No. 2,311,781, the preparation of the condensate which is esterified in accordance with the present invention, is set forth in greater detail. Reference is made to that application for a complete disclosure as to the method of making this condensate which is employed as one of the starting materials in accordance with the process of the present invention.

It has been found that the polyhydric alcohol esters of a rosin-formaldehyde-maleic anhydride condensate, or similar condensate, have markedly higher melting points than do comparative resins prepared from rosin modified with an equivalent amount of maleic anhydride alone. The improved resinous esters prepared in accordance with the present invention have been found to produce faster bodying, softer oil varnishes than analogous maleic modified rosin esters known heretofore.

As the aldehyde in the preparation of the condensate, there may be employed formaldehyde, either in the form of an aqueous solution thereof or in the form of paraformaldehyde; and other aldehydes which may be used include propionaldehyde, acetaldehyde, butyraldehyde, furfural, benzaldehyde, aldols, etc.

As the base for the condensate which is subsequently esterified, there may be employed an or equivalent rosin acids, such as, for example abietic acid, crystalline abietic acid, isomerized rosin acid, etc. Also, there may be employed polymerized rosin which may be considered to be a mixture of ordinary rosin and the dimer of ordinary rosin in varying proportions. Instead of using an unsaturated rosin acid, there may be employed esters of the unsaturated rosin acids such as, for example, the methyl esters thereof, or the polyhydric alcohol esters, such as, for example the glycerin esters thereof. As the alpha beta unsaturated polycarboxylic acid, I prefer to use maleic anhydride although I may use equivalent materials such as for example maleic acid. Less preferably, I may use fumaric or citraconic acids.

In general, the unsaturated rosinyl compound-aldehyde-maleic anhydride condensate will be prepared from about 1 to about 4 mols of aldehyde per mol of the unsaturated rosinyl compound such as rosin or polymerized rosin, or per mol of rosin acid nuclei where an ester is used, and in the presence of from about 0.03 to about 1 mol of maleic anhydride per mol of rosin acid nuclei. In general, it is preferred to employ condensates prepared by condensing from about 1 to about 2 mols of aldehyde with 1 mol of rosin or other unsaturated rosin acid in the presence of from about 0.03 to about 0.5 mol of maleic anhydride per mol of rosin or other rosin acid.

The proportion of alpha beta unsaturated polycarboxylic acid such as maleic anhydride employed may be stated in terms of percentage by weight based on the combined weight of the unsaturated rosinyl compound and the aldehyde. Thus, there may be used about 1% to about 33% and preferably from about 1% to about 15% by weight of the maleic anhydride based on the combined weight of unsaturated rosin acid and the aldehyde.

In some cases, the proportion of aldehyde to unsaturated rosin acid may be even higher than 4 mols per mol of rosin acid, say as high as 5 mols of aldehyde per mol of rosin acid.

In accordance with the present invention, the condensate prepared as above is esterified with either a polyhydric alcohol such as for example: ethylene glycol, glycerin, di-glyceryl ether, tri-glyceryl ether, pentaerythritol, polypentaerythritols such as dipentaerythritol, hexitols, such as sorbitol or mannitol, etc., or with a monohydric alcohol such as: methyl alcohol, ethyl alcohol, propyl alcohol, butyl alcohol, etc.

The esterification of the previously described condensate may be effected in any suitable manner. However, it is preferably effected by heating one or more of the previously mentioned alcohols with the condensate at a temperature of from about 200° C. to about 300° C., but preferably at a temperature of about 250° C. to about 300° C., and in an inert atmosphere. The esterification should be so conducted that the acid number of the final product is not over about 20. This is effected by employing the correct amount of polyhydric alcohol or monohydric alcohol and carrying out the esterification for the requisite period of time.

When employing the preferred condensate in practicing the present invention, namely, the condensate prepared with an unsaturated rosin acid, the amount of glycerin employed for esterification will usually vary from between about 11 to about 13 parts by weight per 100 parts by weight of the condensate. With the same condensate, the amount of pentaerythritol employed will usually range between about 11 and and about 12 parts by weight per 100 parts by weight of the condensate. In the case of dipentaerythritol, the amount employed will usually range from about 8 to about 10 parts by weight per 100 parts by weight of condensate.

The esterification product from the esterification of a condensate made with crystalline abietic acid is particularly advantageous with regard to melting point and acid number. In respect to both melting point and acid number such a product is better than a similar esterification product resulting from the esterification of a condensate prepared with ordinary rosin. Moreover, the condensate prepared with crystalline abietic acid yields a product of improved color.

The resinous esters prepared in accordance with the present invention are adapted for use generally in the plastic and coating composition fields. For example, they may be used in the production of decorative and protective-type lacquer coatings as, for example, in admixture with compatible film forming materials such as nitrocellulose, chlorinated rubber, polycyclo rubber (Pliolite), etc. For example, the glyceryl ester of a condensate prepared by the reaction of 100 parts by weight of rosin, 9.38 parts by weight formaldehyde, and 5 parts by weight of maleic anhydride is compatible with nitrocellulose. The pentaerythritol ester of this condensate is compatible with chlorinated rubber and with polycyclo rubber. The product of the present invention may also be used with oil to produce varnishes, enamels, paints, etc. The esters may be used in inks, adhesives, core oils, greases, in box toes, and as a hardening agent for hardening wax blends, etc.

The following specific examples will serve to illustrate various embodiments of the present invention.

EXAMPLE 1

A. *Preparation of condensate*

Parts by weight
N wood rosin_____ 800
Formaldehyde (as 35.6% Formalin)_____ 75
Maleic anhydride _____ 43.75

The rosin was dissolved to 60% solids in benzene, and the formaldehyde and maleic anhydride added thereto. The emulsion thus formed was vigorously agitated and it was then refluxed for about 5 to 7 hours at a temperature of about 75–85° C. After distilling off of the volatile components from the mixture, the condensate obtained was heated to about 240° C. and held there for about 30 minutes at about 15 mm. pressure. The resin obtained was poured. Upon cooling to room temperature, a hard, brittle, amber-colored condensate was obtained analyzing:

Drop melting point_____° C__ 120
Acid number_____ 160
Color_____ I

B. *Preparation of ester of condensate*

The condensate prepared as in A above was esterified with glycerin, using about 12 parts by weight of glycerin per 100 parts by weight of condensate. Esterification was carried out in an inert atmosphere at a temperature varying from about 275° C. to about 285° C. Esterification was continued until the decrease in acid number of the ester thus formed had dropped to less than 2 units per hour and this required 7 to 9 hours to accomplish. On pouring, and cooling to room temperature, a hard brittle resin was obtained analyzing:

Melting point _____ °C__ 134
Acid number _____ 13
Color _____ M

In the preparation of the condensate as in A above, the ratio of approximately 5½ parts by weight of the maleic anhydride per 100 parts by weight of rosin was employed. A comparative resin made by reacting 5½ parts by weight of maleic anhydride with 100 parts by weight of rosin and subsequently esterifying with glycerin in the same manner as in B, melted at about 110–115° C.

Example 2

The condensate of Example 1A was esterified with pentaerythritol, using about 11½ parts by weight of pentaerythritol per 100 parts by weight of the condensate, the esterification being accomplished at a temperature of about 285–295° C. in the same manner as in Example 1B, until no further decrease in acid number of the resin was observed. The hard, brittle resin obtained analyzed:

Melting point _____ °C__ 174
Acid number _____ 20
Color _____ G to I

A comparative pentaerythritol ester of a condensate made from 5½ parts by weight of maleic anhydride per 100 parts by weight of rosin melted at approximately 145 to 158° C.

Example 3

A. Preparation of condensate

| | Parts by weight |
|---|---|
| N wood rosin | 100 |
| Formaldehyde (as 35.6% Formalin) | 9.38 |
| Maleic anhydride | 10.9 |

The foregoing ingredients were reacted in the same manner as in Example 1A. The condensate obtained analyzed:

Melting point _____ °C__ 144
Acid number _____ 173
Color _____ I

B. Esterification of condensate

The condensate of A was esterified in the same manner as in Example 1 with glycerin using 13 parts by weight of glycerin per 100 parts by weight of the condensate. The ester obtained analyzed:

Melting point _____ °C__ 183
Acid number _____ 15
Color _____ K to M

Example 4

A. Preparation of condensate

| | Parts by weight |
|---|---|
| Polymerized rosin (melting point 98° C.) | 800 |
| Formaldehyde (as 35.6% Formalin) | 75 |
| Maleic anhydride | 43.75 |

These ingredients were reacted in the same manner as in Example 1A. The condensate analyzed:

Melting point _____ °C__ 135
Acid number _____ 161
Color _____ I

B. Esterification of condensate

The foregoing condensate was esterified with glycerin using 12½ parts by weight of glycerin per 100 parts by weight of the condensate in the same manner as in Example 1B. The esterification was conducted at a temperature of about 275–285° C. The resin obtained analyzed:

Melting point _____ °C__ 168
Acid number _____ 8.5
Color _____ I—

Example 5

The condensate of Example 4 was esterified with pentaerythritol instead of with glycerin, in accordance with the procedure outlined in Example 1B, and using a ratio of 11 parts by weight of pentaerythritol per 100 parts by weight of the condensate. Esterification was effected at a temperature of about 285–295° C. and required about 16 hours. The ester analyzed:

Melting point _____ °C__ 194
Acid number _____ 14.5
Color _____ E—

Example 6

A. Preparation of condensate

| | Parts by weight |
|---|---|
| N wood rosin | 800 |
| Formaldehyde (as 35.6% Formalin) | 150 |
| Maleic anhydride | 47.5 |

The rosin was dissolved in benzene to form a solution containing 60% solids. The formaldehyde and maleic anhydride were then added to the thus formed solution and the mixture agitated violently with refluxing at a temperature of about 75–85° C. for about 6 hours. The volatile components of the reaction mixture were then distilled off and the condensate obtained was heated to 240° C. and held at that temperature for about 30 minutes under reduced pressure. Upon cooling, a resin was obtained which analyzed:

Melting point _____ °C__ 132
Acid number _____ 150
Color _____ I to G

B. Esterification of condensate

The condensate obtained in A above was esterified as in Example 1B with about 12 parts by weight of glycerin per 100 parts by weight of the condensate at temperatures varying from 275–285° C. The ester analyzed:

Melting point _____ °C__ 148
Acid number _____ 10.4
Color _____ G to K

Example 7

A. Preparation of condensate

| | Parts by weight |
|---|---|
| N wood rosin | 1,500 |
| Formaldehyde (35.6% Formalin) | 422 |
| Maleic anhydride | 96 |

The rosin was dissolved in benzene to form a solution containing 60% solids. To the thus formed solution was added the formalin and the maleic anhydride. The mixture thus formed was refluxed at a temperature of from about 75–85° C. for approximately 3 hours. After distilling off of the volatile components, the condensate obtained was heated to about 240° C. and held at this temperature under a reduced pressure of 15 mm. for 30 minutes. The condensate obtained analyzed:

| | |
|---|---|
| Melting point | 159 |
| Acid number | 147 |
| Color | G |

B. *Esterification of condensate*

The foregoing condensate from A above was esterified with about 12 parts by weight of glycerin per about 100 parts by weight of the condensate according to the procedure of Example 1B and at a temperature of 275–285° C. The hard, brittle resin obtained analyzed:

| | |
|---|---|
| Melting point °C | 173 |
| Acid number | 10 |
| Color | I— |

EXAMPLE 8

A. *Preparation of condensate*

| | Parts by weight |
|---|---|
| N wood rosin | 1,800 |
| Crotonaldehyde | 169 |
| Maleic anhydride | 103 |

The rosin was dissolved in benzene to form a solution containing about 60% solids. To the thus formed solution was added the crotonaldehyde and the maleic anhydride. The solution was then heated to 75° C. and held at about that temperature for about 7 hours with agitation. After distilling off of the volatile components, the condensate obtained was heated to about 240° C. and held at that temperature for about 30 minutes while maintaining it under a pressure of about 15 mm. On cooling, a hard brittle resin was obtained analyzing:

| | |
|---|---|
| Melting point °C | 125 |
| Acid number | 157 |
| Color | I |

B. *Esterification of condensate*

The foregoing condensate from A was esterified using about 12½ parts by weight of glycerin per about 100 parts by weight of the condensate according to the procedure of Example 1B. The resulting ester analyzed:

| | |
|---|---|
| Melting point °C | 118 |
| Acid number | 14 |
| Color | 43 Amber (M—) |

EXAMPLE 9

A. *Preparation of condensate*

A condensate was prepared exactly as in Example 1 but using the following ratios of reacting ingredients:

| | Mols | Parts by weight |
|---|---|---|
| N wood rosin | 1 | 320 |
| Formaldehyde | 2 | 60 |
| Maleic anhydride | 0.75 | 75 |

B. *Esterification of condensate*

| | Parts by weight |
|---|---|
| Condensate from A | 300 |
| Linseed oil | 300 |
| Glycerin | 36 |

The condensate and the linseed oil were admixed and heated to a temperature of about 280° C. for about 30 minutes. The glycerin was then added to the reaction mixture and the whole heated to a temperature of about 280–290° C. for about 6 hours. The oil-modified resin thus formed was sparged for ½ hour with $CO_2$, to form a viscous liquid resin having an acid number of 3.8. When cut to 50% solids in xylene, there was obtained a varnish having these characteristics:

| | |
|---|---|
| Gardner-Holdt viscosity | C |
| Color (Hellige) | 4L |

EXAMPLE 10

A. *Preparation of condensate with crystalline abietic acid*

| | Parts by weight |
|---|---|
| Crystalline abietic acid | 500 |
| Formaldehyde (as 35.6% Formalin) | 50 |
| Maleic anhydride | 30 |

The crystalline abietic acid was obtained by crystallization from a saturated solution of N wood rosin and ethyl alcohol. This crystalline material was dissolved in benzene to form a solution containing about 60% solids. To the thus formed solution was added the formaldehyde and the maleic anhydride. The mixture thus formed was refluxed for about 7 hours at a temperature of about 75° C. whereupon the volatile components were distilled off. The condensate was then heated to a temperature of about 240° C. and held at that temperature for about 30 minutes under a pressure of about 15 mm. A hard, brittle resin was obtained analyzing:

| | |
|---|---|
| Acid number | 168 |
| Melting point °C | 132 |
| Color | 29 Amber (WG—) |

B. *Esterification of condensate*

The condensate prepared as in A above was esterified with glycerin in the manner described in Example 1B using about 11 parts by weight of glycerin per about 100 parts by weight of the condensate. The resulting ester analyzed:

| | |
|---|---|
| Melting point °C | 157 |
| Acid number | 10 |
| Color | 35 Amber (M+) |

C. *Preparation of comparative condensate from N wood rosin instead of crystalline abietic acid*

Procedure A of this example was duplicated exactly except that N wood rosin was used in place of the crystalline abietic acid. The condensate produced analyzed:

| | |
|---|---|
| Melting point °C | 135 |
| Acid number | 161 |
| Color | 80 Amber+0.5 Red (I—) |

D. *Esterification of comparative condensate of C*

The glycerin ester of the condensate of A was prepared in the same manner as in B. The resulting ester analyzed:

| | |
|---|---|
| Acid number | 10.5 |
| Melting point °C | 144 |
| Color | 47 Amber (M—) |

The foregoing results shown in Example 10 illustrate that the use of a condensate prepared with crystalline abietic acid yields glycerin esters of improved color and melting point as compared to a similar ester prepared from a condensate made with N wood rosin.

EXAMPLE 11

A. *Preparation of condensate*

| | Parts by weight |
|---|---|
| N wood rosin | 100 |
| Formaldehyde (as 35.6% Formalin) | 9.38 |
| Maleic anhydride | 7 |

These ingredients were reacted as before to provide a concentrate. The condensate produced analyzed:

Acid number_____ 167
Melting point_____°C__ 124
Color_____ 56 Amber or 40 Amber+1 Red

B. *Esterification of condensate with pentaerythritol*

About one hundred parts by weight of the condensate from A were esterified with about twelve parts by weight of pentaerythritol in the manner described in Example 1B. The resulting ester analyzed:

Acid number_____ 19
Melting point_____°C__ 165
Color_____ 45 Amber or 40 Amber+0.5 Red

C. *Esterification of condensate with diglycerin*

About one hundred parts by weight of the condensate from A above were esterified with about 14.6 parts by weight of diglycerin in the manner described in Example 1B. The resulting ester analyzed:

Acid number_____ 10
Melting point_____°C__ 179–180
Color___ 80 Amber+1 Red or 40 Amber+3.5 Red

EXAMPLE 12

A. *Preparation of condensate*

Parts by weight
N wood rosin _____ 1,000
Maleic anhydride _____ 109
Formaldehyde (as 35% Formalin) _____ 93.8

The rosin was dissolved in xylene to form a solution containing about 60% solids. To this solution was added the maleic anhydride and the formalin. The mixture thus formed was then refluxed for about four hours at a temperature of about 91° to 95° C. to effect condensation thereof. A stream of carbon dioxide was slowly bubbled through the thus formed emulsion, to provide agitation during the heating operation.

The volatile components, i. e., water and xylene, were removed from the above described condensate by distilling them off with the aid of stirring. Removal of the solvent was continued with stirring until the temperature of the condensate reached 200° C.

The condensate obtained had the following analysis:

Melting point_____°C__ 118
Acid number _____ 169
Color (cut cube) _____ 40 Amber

B. *Esterification of condensate with methyl alcohol*

The condensate prepared in A above was esterified in an autoclave with methyl alcohol. 500 grams of the condensate were heated with 200 grams of methyl alcohol and with 1 gram of iron resinate, as a catalyst, for a period of about 5 hours at a temperature of approximately 250° C. and under a pressure of about 1000 pounds per square inch.

After the esterification was completed, excess alcohol was removed from the esterification mixture by distillation, leaving in the still a viscous brown liquid having an acid number of 24. The crude ester, thus formed, was then vacuum distilled under a pressure of about 5–10 mm. and at temperatures of about 205° to 221° C., yielding a light, yellow viscous liquid having an acid number of about 12 to 13, and a color of 5 amber.

EXAMPLE 13

A. *Preparation and esterification of conjoint condensation product of ester gum, formaldehyde, and maleic anhydride*

Parts by weight
Glyceryl ester of N wood rosin (M. P. 90°
  C.; acid No. 7; color 19A) _____ 1,000
Maleic anhydride _____ 109
Formaldehyde (as 35% Formalin) _____ 93.8

The ester gum was dissolved in benzene to form a solution containing about 60% solids. Maleic anhydride and the formaldehyde were then added to this solution and condensation thereof was effected in the same manner as in Example 12A above. After removal of the volatile materials by distillation and heating the residue to about 200° C., the condensate analyzed:

Melting point_____°C__ 141
Acid number_____ 48
Color (cut cube) __68 Amber or 40 Amber + 1.5 R.

Without the addition of any glycerin this partially esterified condensate was heated in the previously described manner to a temperature of about 275° to 285° C. and after being maintained at this temperature for about 5 to 6 hours, a resin was formed which analyzed as follows:

Melting point_____°C__ 168
Acid number_____ 29
Color (cut cube) _____80 Amber + 7 Red + 2 Blue By adding a quantity of glycerin (2.9 parts by weight per 100 parts by weight of condensate formed in A above) calculated from the acid number of the condensate, a resin was obtained analyzing:

Melting point_____°C__ 179
Acid number_____ 19
Color (cut cube) _____80 Amber + 3 Red

EXAMPLE 14

A. *Preparation of condensate of methyl ester of rosin with formaldehyde and maleic anhydride*

Parts by weight
Methyl ester of rosin _____ 1,000
Maleic anhydride _____ 109
Formaldehyde (as 35% Formalin) _____ 93.8

The methyl ester of rosin was dissolved in benzene to form a solution containing about 60% solids. To this solution was added the maleic anhydride and the formalin. The condensation of these compounds was accomplished in the same manner as described in Example 12A above. The volatile materials were removed from the condensate by distillation and the residue was then heated to about 200° C. The soft sticky condensate, thus produced, analyzed:

Acid number _____ 47
Color (poured) _____ 38 Amber (Lovibond)
                        M 6 (Photoelectric)

B. *Esterification of condensate*

The condensate from A above was esterified with 3.1 parts by weight of glycerin per 100 parts by weight of condensate according to the procedure set forth in Example 1B. After 7 hours reaction a soft, flexible resin was obtained which analyzed:

Melting point _____°C__ 60
Acid number _____ 15
Color (poured) _____ 80 Amber + 5 Red or
                            40 Amber + 7.5 Red From the foregoing, it will be seen that the rosinyl-base esterification products produced in accordance with the present invention possess new and advantageous properties. These resinous products may be used wherever their properties render them suitable for replacement of other resins used heretofore. The use of the glycerin and other polyhydric alcohol esters in varnishes and similar coating compositions is particularly advantageous. The fatty acid modified resin typified by Example 9 is especially advantageous because it is both a liquid resin and a varnish and may be used as a varnish upon the addition of appropriate driers and thinners.

What I claim and desire to protect by Letters Patent is:

1. As a new article of manufacture, a reaction product of an alcohol and a conjoint condensation product of the simultaneous reaction of a mixture of reactants which consist essentially of an unsaturated rosinyl compound selected from the group consisting of unsaturated rosin acids and esters thereof, an aldehyde, and an alpha beta unsaturated polycarboxylic acid.

2. As a new article of manufacture, a reaction product of a monohydric alcohol and a conjoint condensation product of the simultaneous reaction of a mixture of reactants which consist essentially of an unsaturated rosinyl compound selected from the group consisting of unsaturated rosin acids and esters thereof, an aldehyde, and an alpha beta unsaturated polycarboxylic acid.

3. As a new article of manufacture, a reaction product of a polyhydric alcohol and a conjoint condensation product of the simultaneous reaction of a mixture of reactants which consist essentially of an unsaturated rosinyl compound selected from the group consisting of unsaturated rosin acids and esters thereof, an aldehyde, and an alpha beta unsaturated polycarboxylic acid.

4. As a new article of manufacture, a reaction product of an alcohol and a conjoint condensation product of the simultaneous reaction of a mixture of reactants which consist essentially of an unsaturated rosin acid, an aldehyde and maleic anhydride, said condensation product being formed from about 1 to about 4 mols of said aldehyde and from about 0.03 to about 1 mol of said maleic anhydride per mol of said unsaturated rosin acid.

5. As a new article of manufacture, a reaction product of a polyhydric alcohol and a conjoint condensation product of the simultaneous reaction of a mixture of reactants which consist essentially of an unsaturated rosin acid, an aldehyde, and maleic anhydride, said condensation product being formed from about 1 to about 2 mols of said aldehyde and from about 0.03 to about 0.5 mols of said maleic anhydride per mol of said unsaturated rosin acid.

6. As a new article of manufacture, a reaction product of a polyhydric alcohol and a conjoint condensation product of the simultaneous reaction of a mixture of reactants which consist essentially of rosin, formaldehyde, and maleic anhydride, said condensation product being formed from about 1 to about 4 mols of said formaldehyde and from about 0.03 to about 1 mol of said maleic anhydride per mol of said rosin.

7. As a new article of manufacture, a reaction product of a polyhydric alcohol and a conjoint condensation product of the simultaneous reaction of a mixture of reactants which consist essentially of polymerized rosin, formaldehyde, and maleic anhydride; said condensation product being formed from about 1 to about 4 mols of said formaldehyde and from about 0.03 to about 1 mol of said maleic anhydride per mol of said polymerized rosin.

8. As a new article of manufacture, a viscous liquid reaction product of a polyhydric alcohol, linseed oil and a conjoint condensation product of the simultaneous reaction of a mixture of reactants which consist essentially of rosin, formaldehyde, and maleic anhydride, said condensation product being formed from about 1 to about 4 mols of said formaldehyde and from about 0.03 to about 1 mol of said maleic anhydride per mol of said rosin.

9. As a new article of manufacture, a reaction product comprising a glycerol ester of the conjoint condensation product of the simultaneous reaction of a mixture of reactants which consist essentially of rosin, maleic anhydride and formaldehyde.

10. As a new article of manufacture, a reaction product comprising a methyl alcohol ester of the conjoint condensation product of the simultaneous reaction of a mixture of reactants which consist essentially of rosin, maleic anhydride, and formaldehyde.

11. As a new article of manufacture, a reaction product comprising a polyhydric alcohol ester of the conjoint condensation product of the simultaneous reaction of a mixture of reactants which consist essentially of methyl abietate, maleic anhydride, and formaldehyde.

12. The process of producing a synthetic resin which comprises esterifying a conjoint condensation product of the simultaneous reaction of a mixture of reactants which consist essentially of a material selected from the group consisting of unsaturated rosin acids and esters thereof, an aldehyde, and an alpha beta unsaturated polycarboxylic acid with an alcohol.

13. The process of producing a synthetic resin which comprises esterifying a conjoint condensation product of the simultaneous reaction of a mixture of reactants which consist essentially of an unsaturated rosinyl compound selected from the group consisting of unsaturated rosin acids and esters thereof, an aldehyde, and an alpha beta unsaturated polycarboxylic acid with a monohydric alcohol.

14. The process of producing a synthetic resin which comprises esterifying a conjoint condensation product of the simultaneous reaction of a mixture of reactants which consist essentially of an unsaturated rosinyl compound selected from the group consisting of unsaturated rosin acids and esters thereof, formaldehyde, and maleic anhydride with a polyhydric alcohol.

PAUL H. SCRUTCHFIELD.